US008180069B2

(12) United States Patent
Buck et al.

(10) Patent No.: US 8,180,069 B2
(45) Date of Patent: May 15, 2012

(54) NOISE REDUCTION THROUGH SPATIAL SELECTIVITY AND FILTERING

(75) Inventors: Markus Buck, Biberach (DE); Tobias Wolff, Ulm (DE)

(73) Assignee: Nuance Communications, Inc., Burlington, MA (US)

( * ) Notice: Subject to any disclaimer, the term of this patent is extended or adjusted under 35 U.S.C. 154(b) by 947 days.

(21) Appl. No.: 12/189,545

(22) Filed: Aug. 11, 2008

(65) Prior Publication Data

US 2009/0067642 A1 Mar. 12, 2009

(30) Foreign Application Priority Data

Aug. 13, 2007 (EP) .................................... 07015908

(51) Int. Cl.
*H04B 15/00* (2006.01)

(52) U.S. Cl. ......... 381/94.1; 381/94.2; 381/92; 704/226

(58) Field of Classification Search .................... 381/92, 381/94.1–94.2, 94.7; 704/210, 226
See application file for complete search history.

(56) References Cited

U.S. PATENT DOCUMENTS

| | | | | |
|---|---|---|---|---|
| 6,415,253 | B1 * | 7/2002 | Johnson | 704/210 |
| 2005/0118956 | A1 * | 6/2005 | Haeb-Umbach et al. | 455/67.11 |
| 2007/0055505 | A1 * | 3/2007 | Doclo et al. | 704/226 |

FOREIGN PATENT DOCUMENTS

| | | | |
|---|---|---|---|
| EP | 1475997 | A2 | 11/2004 |
| EP | 1475997 | A3 | 12/2004 |
| EP | 1640971 | A1 | 3/2006 |

OTHER PUBLICATIONS

Brandstein, M. et al., Chapter 2, "Superdirective Microphone Arrays," *Microphone Arrays*, Springer, Berlin, Germany, Copyright 2001, pp. 19-32.

Ephraim, Y. et al., "Speech Enhancement Using a Minimum Mean-Square Error Short-Time Spectral Amplitude Estimator," *IEEE Transactions on Acoustics, Speech and Signal Processing*, vol. ASSP-32, No. 6, 1984, pp. 1109-1121.

Griffiths, L. J. et al., "An Alternative Approach to Linearly Constrained Adaptive Beamforming," *IEEE Transactions on Antennas and Propagation*, vol. AP-30, No. 1, 1982, pp. 27-34.

Hänsler, E., Chapter 11, *Statistische Signale*, Springer Verlag, Berlin, Germany, 2001, pp. 390-425.

Herbordt, W. et al., "Frequency-Domain Integration of Acoustic Echo Cancellation and a Generalized Sidelobe Canceller with Improved Robustness," European Transactions on Telecommunications, vol. 13, No. 2, 2002, pp. 123-132.

* cited by examiner

*Primary Examiner* — Wai Sing Louie
*Assistant Examiner* — Sue Tang
(74) *Attorney, Agent, or Firm* — Sunstein Kann Murphy & Timbers LLP

(57) ABSTRACT

A signal processor uses input devices to detect speech or aural signals. Through a programmable set of weights and/or time delays (or phasing) the output of the input devices may be processed to yield a combined signal. The noise contributions of some or each of the outputs of the input devices may be estimated by a circuit element or a controller that processes the outputs of the respective input devices to yield power densities. A short-term measure or estimate of the noise contribution of the respective outputs of the input devices may be obtained by processing the power densities of some or each of the outputs of the respective input devices. Based on the short-term measure or estimate, the noise contribution of the combined signal may be estimated to enhance the combined signal when processed further. An enhancement device or post-filter may reduce noise more effectively and yield robust speech based on the estimated noise contribution of the combined signal.

16 Claims, 9 Drawing Sheets

NOISE REDUCTION THROUGH SPATIAL SELECTIVITY AND FILTERING

PRIORITY CLAIM

This application claims the benefit of priority from European Patent Application No. 07015908.2, filed Aug. 13, 2007, entitled "Noise Reduction By Combined Beamforming and Post-Filtering," which is incorporated by reference.

BACKGROUND OF THE INVENTION

1. Technical Field

The inventions relate to noise reduction, and in particular to enhancing acoustic signals that may comprise speech signals.

2. Related Art

Speech communication may suffer from the effects of background noise. Background noise may affect the quality and intelligibility of a conversation and, in some instances, prevent communication.

Interference is common in vehicles. It may affect hands free systems that are susceptible to the temporally variable characteristics that may define some noises. Some systems that attempt to suppress these noises through spectral differences that may distort speech. These systems may dampen the spectral components affected by noise that may include speech without removing the noise.

Due to the limited amount of time available to adapt to noise, some systems are not successful in blocking its time-variant nature. Unfortunately, non-stationary disturbances are common in many applications.

SUMMARY

A signal processor uses input devices to detect speech or aural signals. Through a programmable set of weights and/or time delays (or phasing) the output of the input devices may be processed to yield a combined signal. The noise contributions of some or each of the outputs of the input devices may be estimated by a circuit element or a controller that processes the outputs of the respective input devices to yield power densities. A short-term measure or estimate of the noise contribution of the respective outputs of the input devices may be obtained by processing the power densities of some or each of the outputs of the respective input devices. Based on the short-term measure or estimate, the noise contribution of the combined signal may be estimated to enhance the combined signal when processed further. An enhancement device or post-filter may reduce noise more effectively and yield robust speech based on the estimated noise contribution of the combined signal.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
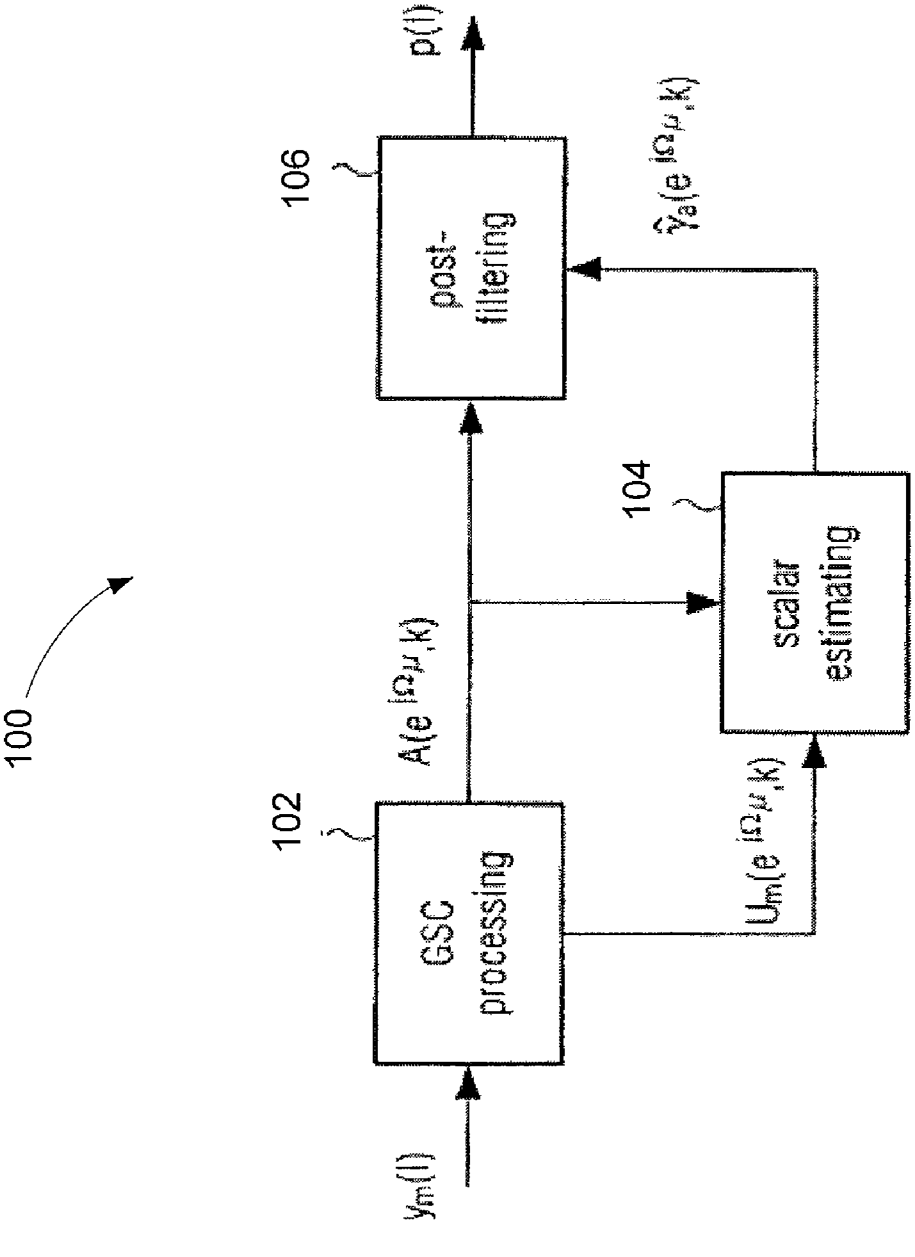
FIG. 1 is a noise reduction system.

A signal processor uses sensors, transducers, and/or microphones (e.g., input devices) to detect speech or aural signals. The input devices convert sound waves (e.g., speech signals) into analog signals or digital data. The input devices may be distributed about a space such as a perimeter or positioned in an arrangement like an array (e.g., a linear or planar array). Through a programmable set of weights (e.g., fixed weightings) and/or time delays (or phasing) the output of the input devices may be processed to yield a combined signal. The noise contributions of some or each of the outputs of the input devices may be estimated by a circuit element (e.g., a blocking matrix) and/or a controller (e.g., a processor) that processes the outputs of the respective input devices to yield (spectral) power densities. A short-term measure or estimate (e.g., an average short-time power density) of the noise contribution of the respective outputs of the input devices may be obtained by processing the (spectral) power densities of some or each of the outputs of the respective input devices. Based on the short-term measure or estimate, the noise contribution (or spectral power densities of the noise contribution) of the combined signal may be estimated to enhance the combined signal when processed further (e.g., post filter). The enhancement device or post-filter may reduce noise more effectively and yield robust speech to improve speech quality and/or speech recognition.

In some systems the input devices may comprise two or more (M) transducers, sensors, and/or microphones that are sensitive to sound from one or more directions (e.g., directional microphones). Each of the input devices may detect sound, e.g., a verbal utterance, and generate analog and/or digital communication signals $y_m$ (m=1, . . . , M). The communication signals may be enhanced by a noise reduction process or processor. A signal processor may process data about the location of the input devices and/or the communication signals directions to improve the rejection of unwanted signals (e.g., through a fixed beamformer). The communication signals may be processed by a blocking matrix to represent noise that is present in the communication signals.

In some systems, signals are processed (e.g., a signal processor) in a sub-band domain rather than a discrete time domain. In other systems, signals are processed in a time domain and/or frequency domains. When processing at a sub-band resolution, the communication signals ($y_m$) may be divided into bands by an analysis filter bank to render sub-band signals $Y_m(e^{j\Omega_\mu},k)$. At time k, the frequency sub-band may be represented by $\Omega_\mu$ and the imaginary unit may be represented by j. An enhanced beamformed signal (P) may be filtered by an optional synthesis filter bank to obtain an enhanced audio signal, e.g., a noise reduced speech signal.

A beamformed signal in the sub-band domain may represent a Discrete Fourier transform coefficient $A(e^{j\Omega_\mu},k)$ at time k for the frequency sub-band $\Omega_\mu$. The output of the (signal processor or) beamforming technique may be filtered which may enhance the output and reduce noise. In some systems, the beamformed signals $A(e^{j\Omega_\mu},k)$ may be pre-processed to reduce noise. The incidence or severity of noise may be reduced by identifying or estimating the (power densities) noise contributions of each of the communication signals ($y_m$). In some systems, the noise contributions may be rendered through a blocking matrix. The noise contributions of each of the communication signals may be substantially suppressed (e.g., subtracted) before the signals are combined to obtain signal $A(e^{j\Omega_\mu},k)$. A General Sidelobe Canceller (GSC) that may include a delay-and-sum beamformer, for example, may suppress noise before a post-filtering process removes residual noise.

In some systems, an adaptive weighted sum beamformer may combine time aligned signals $y_m$ of M input devices. An adaptive weighted sum may include time dependent weights that are recalculated more than once (e.g., repeatedly) to maintain directional sensitivity to a desired signal. The time dependent weights may further minimize directional sensitivity to noise sources.

A post-filtering process may be based on an estimated (spectral) power density ($\tilde{A}_n$) of the noise contribution ($A_n$) of a beamformed signal (A). The estimated (spectral) power density ($\tilde{A}_n$) may be based on an average short-time power density (V) of a noise contributions of each of the communication signals ($y_m$) as described by Equation 1.

$$V(e^{j\Omega_\mu},k)=\frac{1}{M}\sum_{m=1}^{M}U_m(e^{j\Omega_\mu},k)U_m^*(e^{j\Omega_\mu},k) \quad \text{Equation 1}$$

In Equation 1, M represents the number of input devices or microphones and the asterisk represents the complex conjugate. In each sub-band, $U_m(e^{j\Omega_\mu},k)$ represents the (spectral) power density of a noise contribution present in the communication signal $y_m(l)$ (after sub-band filtering of the communication signal).

In some systems, the post-filter may comprise a Wiener or Weiner like filter. The filter coefficients may be adapted to the estimated power density of the noise contribution of the combined or beamformed signal. To obtain the filter coefficients, a signal processor may multiply the short-time power density (V) of the noise contributions of each of the communication signals ($y_m$) with a real factor $\beta(e^{j\Omega_\mu},k)$ at time k for the frequency sub-band $\Omega_\mu$. The real factor $\beta(e^{j\Omega_\mu},k)$ may be adapted to the expectation values E described in Equation 2.

$$E\{\tilde{A}_n(e^{j\Omega_\mu},k)\}=E\{|A(e^{j\Omega_\mu},k)|^2{}_{A_s(e^{j\Omega_\mu},k)=0}\} \quad \text{Equation 2}$$

In Equation 2, $\tilde{A}_n(e^{j\Omega_\mu},k)$, $A_n(e^{j\Omega_\mu},k)$ and $A_s(e^{j\Omega_\mu},k)$ represent the estimated power density $|A_n(e^{j\Omega_\mu},k)|^2$ of the noise contribution ($A_n$) of the combined or beamformed signal (A), the noise contribution of the beamformed signal (A), and the portion of the wanted signal of the output of the signal processor or beamformer, respectively (A=An+As). If the processed signal detected by the M input devices or arrays (e.g., microphones or microphone array) is speech, the adaptation of the real coefficient $\beta(e^{j\Omega_\mu},k)$ may occur during pauses in speech, e.g., during periods in that $A_s(e^{j\Omega_\mu},k)=0$ or is nearly=0. In some systems, adaptations occur exclusively when speech is not detected or when pauses in speech are detected (e.g., through a speech or pause detector).

When a Weiner technique or filters are used, the hardware and/or software selectively pass certain elements of the combined or beamformed signal (A). The filter passes an enhanced output (P) (e.g., a combined or beamformed signal) according to Equation 3.

$$P(e^{j\Omega_\mu},k)=H(e^{j\Omega_\mu},k)A(e^{j\Omega_\mu},k) \quad \text{Equation 3}$$

where $$H(e^{j\Omega_\mu},k)=1-\hat{\gamma}_a(e^{j\Omega_\mu},k)^{-1} \quad \text{Equation 4}$$

In Equations 3 and 4, $\hat{\gamma}_a(e^{j\Omega_\mu},k)$ represents an estimate for $|A(e^{j\Omega_\mu},k)|^2|A_n(e^{j\Omega_\mu},k)|^{-2}$. In these expressions $A_n(e^{j\Omega_\mu},k)$ comprises the noise contribution of the combined or beamformed signal $A(e^{j\Omega_\mu},k)$ at time k for the frequency sub-band $\Omega_\mu$. $|A(e^{j\Omega_\mu},k)|^2$ may be obtained from the output of the signal processor or beamformer, and the estimate of $|A(e^{j\Omega_\mu},k)|^2$ (e.g., $\tilde{A}_n(e^{j\Omega_\mu},k)$) may be obtained as described above or below. The Wiener filter devices or techniques may be very efficient and reliable post-filters and may have stable convergence characteristics. Through its comparisons, the Weiner filters or techniques may reduce processor loads and processor times.

In some systems, $\hat{\gamma}_a(e^{j\Omega_\mu},k)$, e.g., the estimate for $|A(e^{j\Omega_\mu},k)|^2|A_n(e^{j\Omega_\mu},k)|^{-2}$ may be based on a point estimate that may be based on a method of maximum a posteriori (e.g., MAP or a posterior mode). The MAP estimate may yield Wiener filter characteristics or coefficients that efficiently reduce (residual) noise from the combined or beamformed signal. A first estimate for the filter characteristics may be given by Equations 5 and 6.

$$1-\hat{\gamma}_a(e^{j\Omega_\mu},k)^{-1} \quad \text{Equation 5}$$

$$\hat{\gamma}_a(e^{j\Omega_\mu},k)=|A(e^{j\Omega_\mu},k)|^2/\beta(e^{j\Omega_\mu},k)V(e^{j\Omega_\mu},k) \quad \text{Equation 6}$$

In Equations 5 and 6, $\hat{\gamma}_a(e^{j\Omega_\mu},k)$ may be optimized through a MAP estimate.

An exemplary method of a MAP estimate in a logarithmic representation may be described by Equation 7

$$\tilde{\Gamma}_a(e^{j\Omega_\mu},k)=10\log\hat{\gamma}_a(e^{j\Omega_\mu},k)=\Gamma_a(e^{j\Omega_\mu},k)+\Delta(e^{j\Omega_\mu},k) \quad \text{Equation 7}$$

The ratio $\Gamma_a(e^{j\Omega_\mu},k)=10\log\{|A(e^{j\Omega_\mu},k)|^2|A_n(e^{j\Omega_\mu},k)|^{-2}\}$ is to be estimated and the estimation error $\Delta(e^{j\Omega_\mu},k)=10\log\{|A_n(e^{j\Omega_\mu},k)|/\tilde{A}_n(e^{j\Omega_\mu},k)\}$ is a measure for the estimated power density of the noise contribution of the combined or beamformed signal $A(e^{j\Omega_\mu},k)$. During speech pauses (e.g., $\Gamma_a(e^{j\Omega_\mu},k)=0$), an estimation error $\Delta(e^{j\Omega_\mu},k)$ may generate artifacts that may be perceived as musical tones. An estimate $\tilde{\Gamma}_a(e^{j\Omega_\mu},k)$ obtained through a MAP method may minimize the musical noise.

FIG. 1 is a block diagram of a noise reduction system 100 that receives the communication signals described by Equation 8.

$$y_m(l),\ m=1,\ldots,M$$

In Equation 8, (l) represents a discrete time index that is obtained by M input devices (e.g., microphones such as directional microphones that may be part of a microphone array). In FIG. 1, the GSC processor 102 interfaces multiple signal processing paths. A first path (or cancellation path) comprises an adaptive path that may include a blocking matrix and an adaptive noise canceller. The second path (or compensation path) may include fixed delay compensation or a fixed beamformer. The compensation or beamformer may enhance signals through time delay compensations. The blocking matrix may be configured or programmed to generate noise reference signals that may dampen or substantially remove (residual) noise from the output signal of the compensation path or fixed beamformer.

Through the GSC processor 102, the Discrete Fourier Transform (DFT) coefficient, e.g., the sub-band signal, $A(e^{j\Omega_\mu},k)$ may be obtained at time k for the frequency sub-band $\Omega_\mu$. For each (or nearly each) channel m, the noise portions $U_m(e^{j\Omega_\mu},k)$ of the communication signals $y_m(l)$ may be obtained as sub-band signals by the blocking matrix that may be part of the cancellation path of the GSC processor 102. In FIG. 1, the scalar estimator 104 $\hat{\gamma}_a(e^{j\Omega_\mu},k)$ may be based on the output of the (cancellation path or) the blocking matrix $U_m(e^{j\Omega_\mu},k)$) and the (compensated output of the fixed beamformer or) output of the GSC $A(e^{j\Omega_\mu},k)$. The hardware and/or software of the post filter 106 selectively passes certain elements of the output of the GSC $A(e^{j\Omega_\mu},k)$ and eliminates and minimizes others to obtain a noise reduced audio or speech signal (a desired or wanted signal) p(l).

Figure 2:
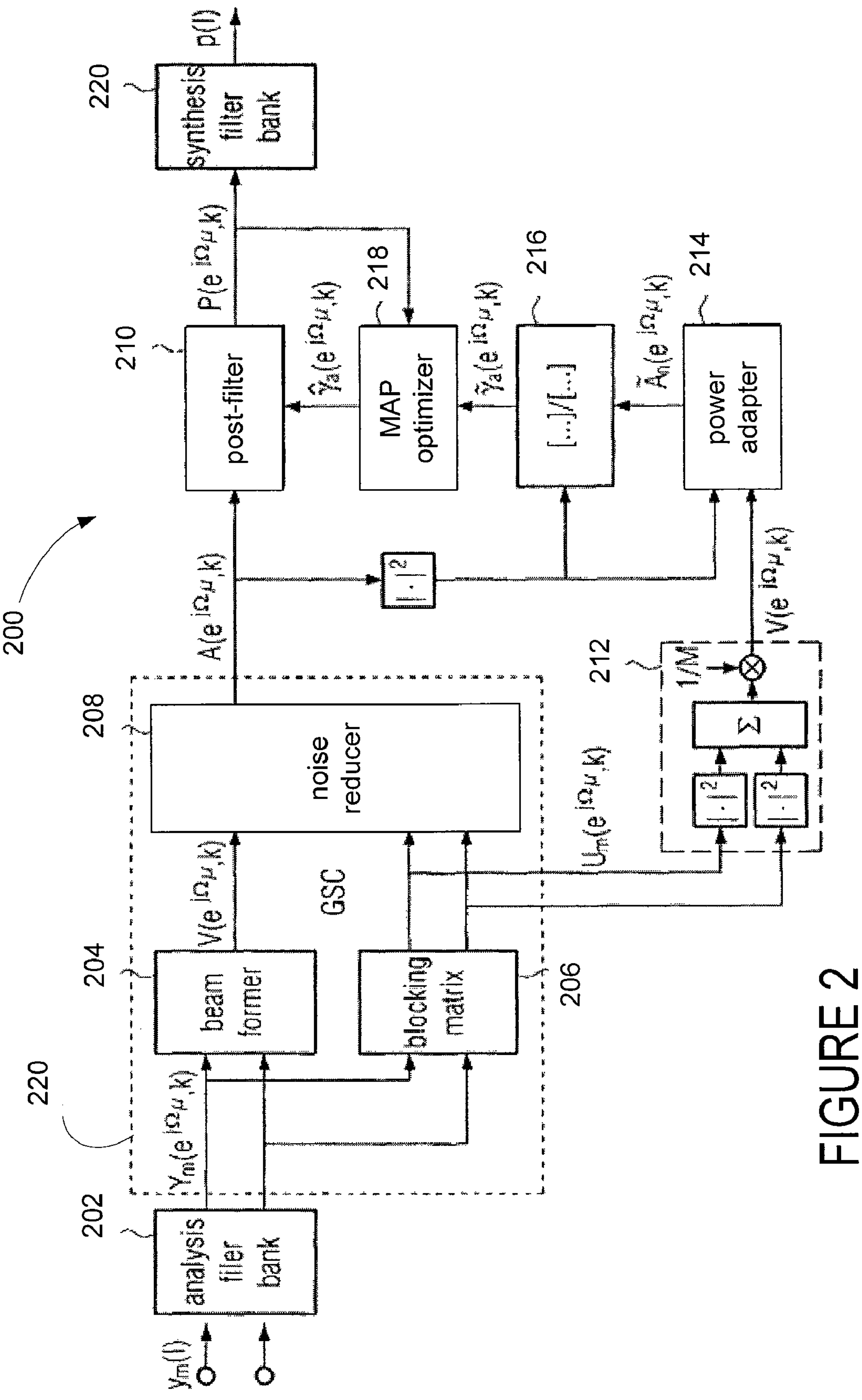
FIG. 2 is an alternative noise reduction system.

FIG. 2 illustrates an alternative noise reduction system 200 that includes a GSC controller 220, a MAP optimizer 218, and a post-filter 210. An interface receives communication signals $y_m(l)$ that are processed by an analysis filter bank 202. The hardware or software of the analysis filter bank 202 rejects signals while passing other that lie with within the sub-band signal $Y_m(e^{j\Omega_\mu},k)$ bands. The analysis filter bank 202 may use a Hanning window, a Hamming windowing, or a Gaussian window, for example. A GSC controller 220 comprising a beamformer 204, a blocking matrix 206, and a noise reducer 208 receives the sub-band signals $Y_m(e^{j\Omega_\mu},k)$. The noise reducer 208 subtracts (or dampens) noise estimated by the blocking matrix 206 from the sub-band signals $Y_m(e^{j\Omega_\mu},k)$ to obtain the noise reduced Discrete Fourier Transform (DFT) coefficient $A(e^{j\Omega_\mu},k)$.

In FIG. 2 the blocking matrix 206 may comprise an adaptive filter. The noise signals output of the blocking matrix 206 may entirely (or in the alternative systems partially or not completely) block a desired or useful signal within the input signals that may result or pass a band limited spectra of the undesired signals. A Walsh-Hadamard kind of blocking matrix or a Griffiths-Jim blocking matrix may be used in some systems. The Walsh-Hadamard blocking matrix may, be established for arrays comprising of $M=2^n$ input devices (or microphones).

In FIG. 2, a post-filter 210 (e.g., a Wiener filter or a spectral subtractor) may further reduce residual noise. When a Wiener-like filter is used, an exemplary filter characteristic may be described by Equation 9.

$$H(e^{j\Omega}) = 1 - \left(\frac{S_{a_s a_s}(\Omega) + S_{a_n a_n}(\Omega)}{S_{a_n a_n}(\Omega)}\right)^{-1} \qquad \text{Equation 9}$$

In Equation 9, $S_{a_s a_s}(\Omega)$ and $S_{a_n a_n}(\Omega)$ represent the auto power density spectrum of the wanted (or desired) signal and the noise disturbances or perturbation contained in the output $A(e^{j\Omega_\mu},k)$ of the GSC controller 220, respectively. In some systems, it may be assumed that the wanted or desired signal and the noise disturbances or perturbation are uncorrelated.

An a posteriori signal-to-noise ratio (SNR) shown in the brackets of Equation 9 may be estimated by a temporal averaging to target stationary disturbances or perturbations. In FIG. 2, the system 200 may suppress time-dependent variations or perturbations. A time-dependent estimate for a post-filtering scalar may be given by Equation 10.

$$\gamma_a(e^{j\Omega_\mu},k) = \frac{|A(e^{j\Omega_\mu},k)|^2}{|A_n(e^{j\Omega_\mu},k)|^2} \qquad \text{Equation 10}$$

In equation 10, $A_n$ represents the noise portion of (A).

An estimate $\hat{\gamma}_a(e^{j\Omega_\mu},k)$ for $\gamma_a(e^{j\Omega_\mu},k)$ of the direction and incidence of sound may be achieved by estimating $A_n$. (A) may be obtained from the output of the GSC controller 220. In FIG. 2, $A_n$ may be obtained from the output of the blocking matrix 206.

In this example, the average short-time power density of the output signals of the blocking matrix 206 $V(e^{j\Omega_\mu},k)$ may obtained by device (or controller) 212 of FIG. 2 as described by Equation 11

$$V(e^{j\Omega_\mu},k) = \frac{1}{M}\sum_{m=1}^{M} U_m(e^{j\Omega_\mu},k)U_m^*(e^{j\Omega_\mu},k) \qquad \text{Equation 11}$$

where the asterisk represents the complex conjugate. An estimate $\tilde{A}_n(e^{j\Omega_\mu},k)$ for $|A_n(e^{j\Omega_\mu},k)$, may be obtained through the real factor $\beta(e^{j\Omega_\mu},k)$, e.g., $\tilde{A}_n(e^{j\Omega_\mu},k)=\beta(e^{j\Omega_\mu},k)V(e^{j\Omega_\mu},k)$. The real factor $\beta(e^{j\Omega_\mu},k)$ may be adapted to satisfy the relation for the expectation values E $$E\{\tilde{A}_n(e^{j\Omega_\mu},k)\}=E\{|A(e^{j\Omega_\mu},k)|^2{}_{A_s(e^{j\Omega_\mu},k)=0}\} \qquad \text{Equation 12}$$

where $A_s(e^{j\Omega_\mu},k)$ is the portion of the wanted signal of the output of the GSC $A(e^{j\Omega_\mu},k)$. Thus, an estimate may be described by Equation 13.

$$\tilde{\gamma}_a(e^{j\Omega_\mu},k) = \frac{|A(e^{j\Omega_\mu},k)|^2}{|\tilde{A}_n(e^{j\Omega_\mu},k)|^2} \qquad \text{Equation 13}$$

By factor $\beta(e^{j\Omega_\mu},k)$, a power adaptation of the power density of the outputs of the GSC controller 220 and the blocking matrix 206 may be estimated or measured through the power adapter 214. The post-filter scalar $\tilde{\gamma}_a(e^{j\Omega_\mu},k)$ estimate may be determined by an estimator 216. The post-filter scalar may be optimized by a MAP optimizer 218.

In FIG. 2, the post-filter 210 may be adapted through a MAP or a posterior mode estimation of the noise power spectral density. An exemplary method of a MAP estimate in a logarithmic domain or a logarithmic estimate of a post-filter scalar may be described by Equation 7.

$$\begin{aligned}\tilde{\Gamma}_a(e^{j\Omega_\mu},k) &= 10\log\tilde{\gamma}_a(e^{j\Omega_\mu},k) \qquad \text{Equation 7}\\ &= 10\log\frac{|A(e^{j\Omega_\mu},k)|^2}{|A_n(e^{j\Omega_\mu},k)|^2} + 10\log\frac{|A(e^{j\Omega_\mu},k)|^2}{|\tilde{A}_n(e^{j\Omega_\mu},k)|^2}\\ &= 10\log\gamma_a(e^{j\Omega_\mu},k) + 10\log\delta(e^{j\Omega_\mu},k)\\ &= \Gamma_a(e^{j\Omega_\mu},k) + \Delta(e^{j\Omega_\mu},k)\end{aligned}$$

where $\Delta(e^{j\Omega_\mu},k)$ represents the estimation error. In some systems, the estimation error may generate artifacts that may be perceived as musical noise.

Some systems minimize the estimation error $\Delta(e^{j\Omega_\mu},k)$. In this explanation $\Gamma_a(e^{j\Omega_\mu},k)$ and $\Delta(e^{j\Omega_\mu},k)$ are assumed to represent stochastic variables. For a given observable, e.g., $\tilde{\Gamma}_a(e^{j\Omega_\mu},k)$, the probability that the quantity that is to be estimated, eg., $\Gamma_a(e^{j\Omega_\mu},k)$, assumes a value may be given by the conditional density $\rho(\Gamma_a|\tilde{\Gamma}_a)$ (in the following the argument $(e^{j\Omega_\mu},k)$ is omitted for simplicity). According to MAP principals, the system may choose the value for $\Gamma_a$ that maximizes $\rho(\Gamma_a|\tilde{\Gamma}_a)$:

$$\hat{\Gamma}_a = \underset{\Gamma_a}{\operatorname{argmax}}\,\rho(\Gamma_a|\tilde{\Gamma}_a) \qquad \text{Equation 14}$$

By Bayes' rule the conditional density ρ may be expressed as Equation 15

$$\rho(\Gamma_a \mid \tilde{\Gamma}_a) = \frac{\rho(\tilde{\Gamma}_a \mid \Gamma_a)\rho(\Gamma_a)}{\rho(\tilde{\Gamma}_a)} \quad \text{Equation 15}$$

where $\rho(\Gamma_a)$ is known as the a priori density. Maximization requires for $$\frac{\partial \rho(\tilde{\Gamma}_a \mid \Gamma_a)\rho(\Gamma_a)}{\partial \Gamma_a} = 0 \quad \text{Equation 16}$$

Based on empirical studies the conditional density can be modeled by a Gaussian distribution with variance $\psi_\Delta$:

$$\rho(\tilde{\Gamma}_a \mid \Gamma_a) = \frac{1}{\sqrt{2\pi\psi_\Delta}} \exp\left(-\frac{(\tilde{\Gamma}_a - \Gamma_a)^2}{2\psi_\Delta}\right) \quad \text{Equation 17}$$

Assuming that the real and imaginary parts of both the wanted signal and the disturbance or perturbation may be described as average-free Gaussians with identical variances $\rho(\Gamma_a)$ can be approximated by $$\rho(\Gamma_a) = \frac{1}{\sqrt{2\pi\psi_{\Gamma_a}(\xi)}} \exp\left(-\frac{(\Gamma_a - \mu_{\Gamma_a}(\xi))^2}{2\psi_{\Gamma_a}(\xi)}\right) \quad \text{Equation 18}$$

with the a priori SNR $\xi=\Psi_s/\Psi_n$ and $\psi_{\Gamma_a}(\xi)=K\xi/(1+\xi)$ and $\mu_{\Gamma_a}(\xi)=10\log(\xi+1)$, where K is the upper limit of the variance $\psi_{\Gamma_a}(\xi)$. Use has shown that satisfying results may be achieved with, e.g., K=50. Solution for the maximization requirement above results in $$\hat{\Gamma}_a = \frac{K\xi\tilde{\Gamma}_a + (\xi+1)\psi_\Delta 10\log(\xi+1)}{K\xi + (\xi+1)\psi_\Delta} \quad \text{Equation 19}$$

from which the scalar estimate $\hat{\gamma}_a=10^{a/10}$ readily results.

In Equation 19 the instantaneous a posteriori SNR is expressed as a function of the perturbed measurement value $\tilde{\Gamma}_a$, the a priori SNR $\xi$ as well as the variance $\Psi_\Delta$ (note that $\hat{\Gamma}_a=\tilde{\Gamma}_a$ for $\Psi_\Delta=0$). In the limit of $\Psi_\Delta \rightarrow \infty$ the filter weights of the Wiener characteristics may be obtained. If the a priori SNR $\xi$ is negligible, e.g., during speech pauses, the filter is closed in order to avoid musical noise artifacts.

Consequently, the above-mentioned Wiener characteristics for the post-filter 210 may be obtained for each time k und frequency interpolation point $\Omega_\mu$ as follows:

$$H(e^{j\Omega_\mu},k)=1-\hat{\gamma}_a^{-1}(e^{j\Omega_\mu},k) \quad \text{Equation 20}$$

The output of the GSC controller 220, e.g., the DFT coefficient $A(e^{j\Omega_\mu},k)$, is filtered by the post-filter 210 that may be adapted by the process described above. The filtering may yield the noise reduced DFT coefficient $P(e^{j\Omega_\mu},k)=H(e^{j\Omega_\mu},k)A(e^{j\Omega_\mu},k)$. In some systems, an optional synthesis filter bank 220 may obtain a full-band noise reduced audio signal p(l).

In the above described system, the parameters $\xi$, $\psi_\Delta$ and K may be determined. For upper limit K of the variance $\psi_{\Gamma_a}(\xi)$ a value of about 50 may be used. The priori SNR $\xi$ may be derived by a decision directed approach. According to noe approach $\xi$ can be estimated as $$\xi(k) = a_\xi \frac{P(k-1)}{\hat{\psi}_n}(1-a_\xi)F\left[\frac{|A(k)|^2}{\hat{\psi}_n} - 1\right] \text{ with } \quad \text{Equation 21}$$

$$F[x] = \begin{cases} x, \text{ if } x > 0 \\ 0, \text{ else} \end{cases} \text{ and } P(k-1)$$

denoting the squared magnitude of the DFT coefficient at the output of the post-filter 210 at time k−1. The real factor $a_\xi$ may be a smoothing factor of almost 1, e.g., 0.98.

In some systems, the estimate for the variance of the perturbation $\hat{\psi}_n$ is not determined by means of temporal smoothing in speech pauses. Rather spatial information on the direction of perturbation shall be used by recursively determining $\hat{\psi}_n$ as described in Equation 22.

$$\hat{\psi}_n(k)=a_n\hat{\psi}_n(k-1)+(1-a_n)\tilde{A}_n(k) \quad \text{Equation 22}$$

with the smoothing factor $a_n$ that might be chosen from between about 0.6 and about 0.8. $\hat{\psi}_\Delta$ may be recursively determined during speech pauses (e.g., $\Psi_s=0$) according to Equation 23.

$$\hat{\psi}_\Delta(k) = a_\Delta(k)\hat{\psi}_\Delta(k-1) + (1-a_\Delta(k))(\Gamma_a(k))^2 \text{ with } \quad \text{Equation 23}$$

$$a_\Delta(k) = \begin{cases} a_0, \text{ if } \psi_s = 0 \\ 0, \text{ else} \end{cases}$$

with the smoothing factor $a_0$ that might be chosen from between 0.6 and 0.8.

Figure 3:
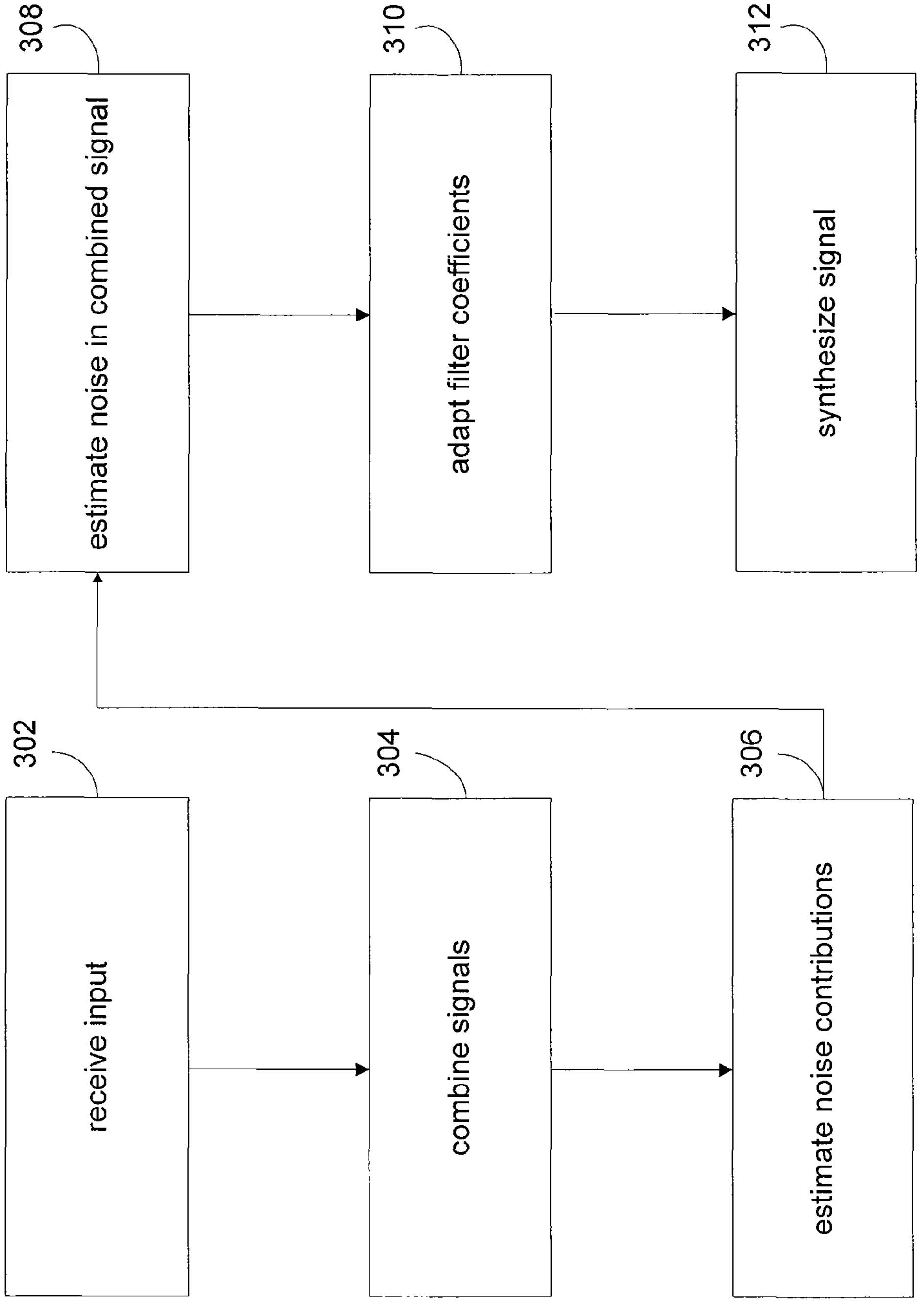
FIG. 3 is process that automatically removes noise (or undesired signals) from an input.

Some processes may automatically remove noise (or undesired signals) to improve speech and/or audio quality. In the automated process of FIG. 3, aural or speech signals are received at 302. The sound waves (e.g., speech signals) may be converted into analog signals or digital data. Through a programmable set of fixed weights and/or time delays the received inputs are processed to yield a combined signal at 304. The noise contributions of each of the detected signals are estimated through a dynamic process at 306. A signal processing technique or dynamic blocking technique may processes the detected inputs to yield (spectral) power densities. A short-term measure or estimate (e.g., an average short-time power density) of the noise contribution of the detected inputs may be obtained by processing the (spectral) power densities of some or each of the detected inputs. Based on the short-term measure or estimate, the noise contribution (or spectral power densities of the noise contribution) of the combined signal may be estimated at 308 to enhance the combined signal when further processed. The filter coefficients (e.g., scalar coefficients) may be adapted from the estimate of the noise contribution of the combined signal at 310. At 312 an optional synthesis filter may reconstruct the signal to yield a robust speech.

Figure 4:
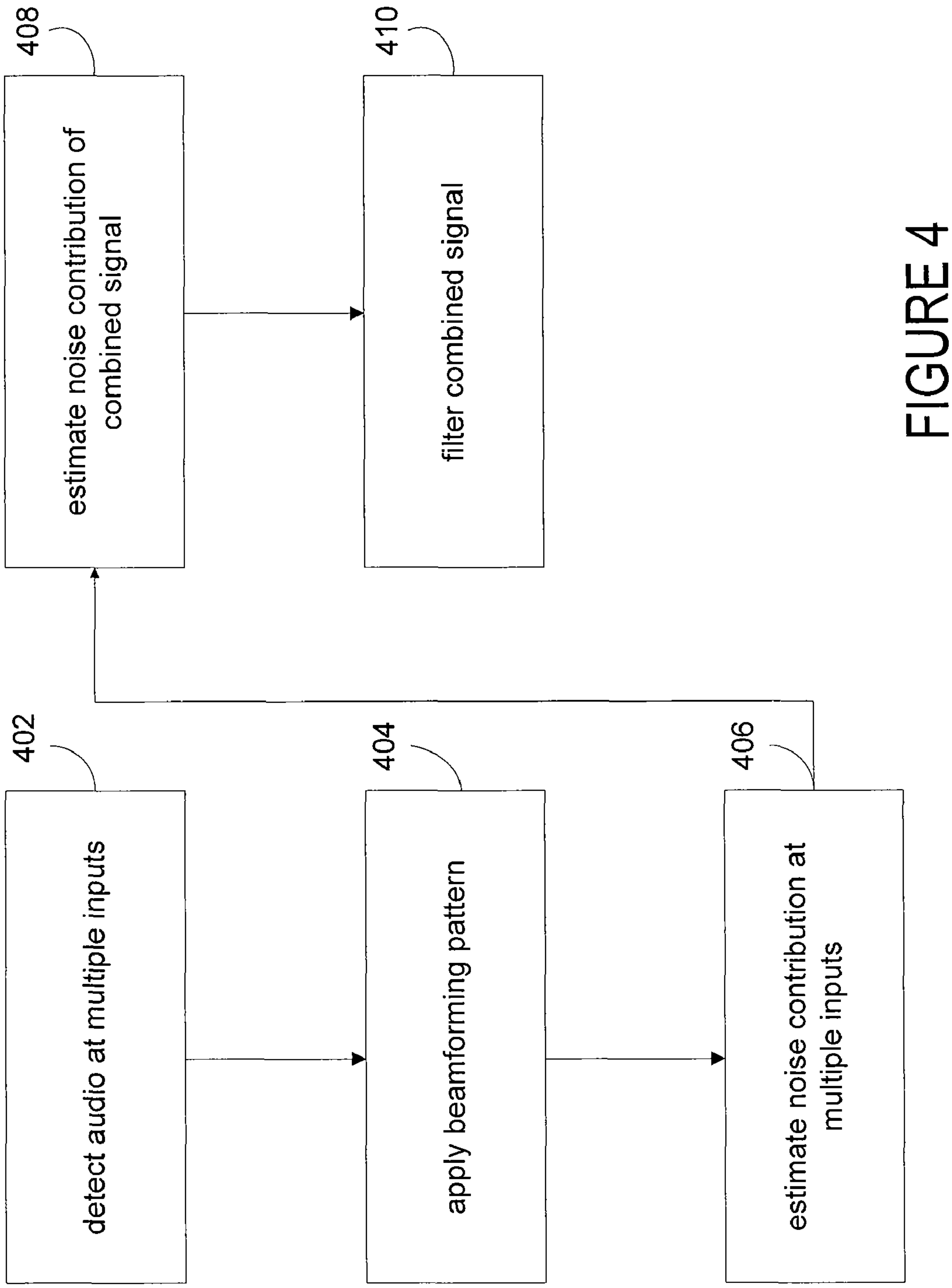
FIG. 4 is an alternative process that automatically removes noise (or undesired signals) from an input.

In another processes shown in FIG. 4, an input array (e.g., a microphone array comprising at least two microphones) may detect multiple communication signals at 402. A signal processing method may selectively combine (e.g., beamformed) the multiple communication signals to a fixed beamforming pattern at 404. An adaptive filtering process may process the communication signals to obtain the power densities of noise contributions of each of the communication signals at 406. The signal processing method may process, the power densities of noise the contributions of each of the communication signals to render an average short-time power density. The signal processing method may estimate the power density of a noise contribution of the combined signal (or beamformed signal) based on the average short-time power density at 408. A post-filtering process at 410 may filter the combined signal (or beamformed signal) based on the estimated power density of the noise contribution of the beamformed signal to improve the rejection of unwanted or undesired signals.

Figure 5:
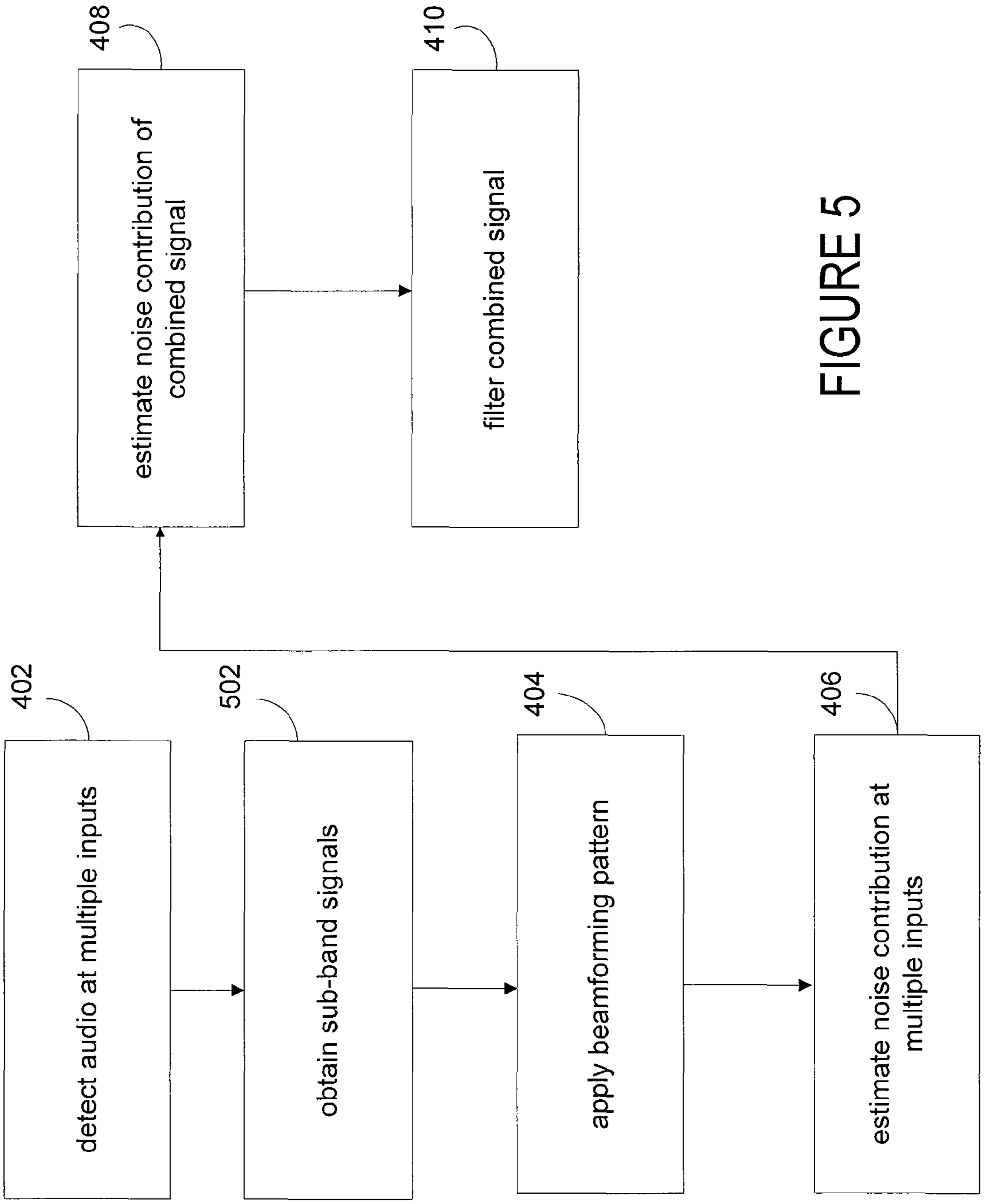
FIG. 5 is another alternative process that automatically removes noise (or undesired signals) from an input.
Figure 6:
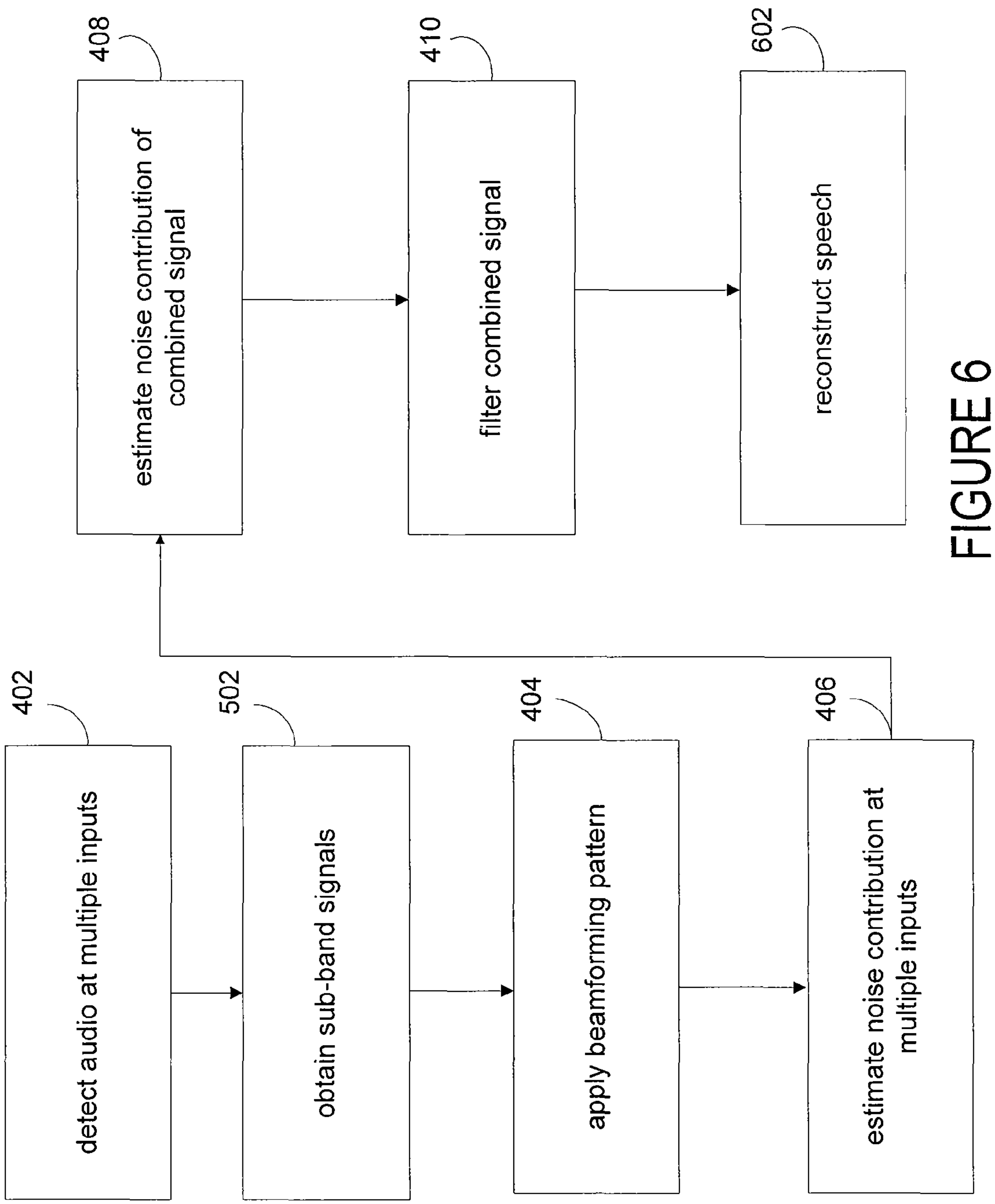
FIG. 6 is another alternative process that automatically removes noise (or undesired signals) from an input.
Figure 7:
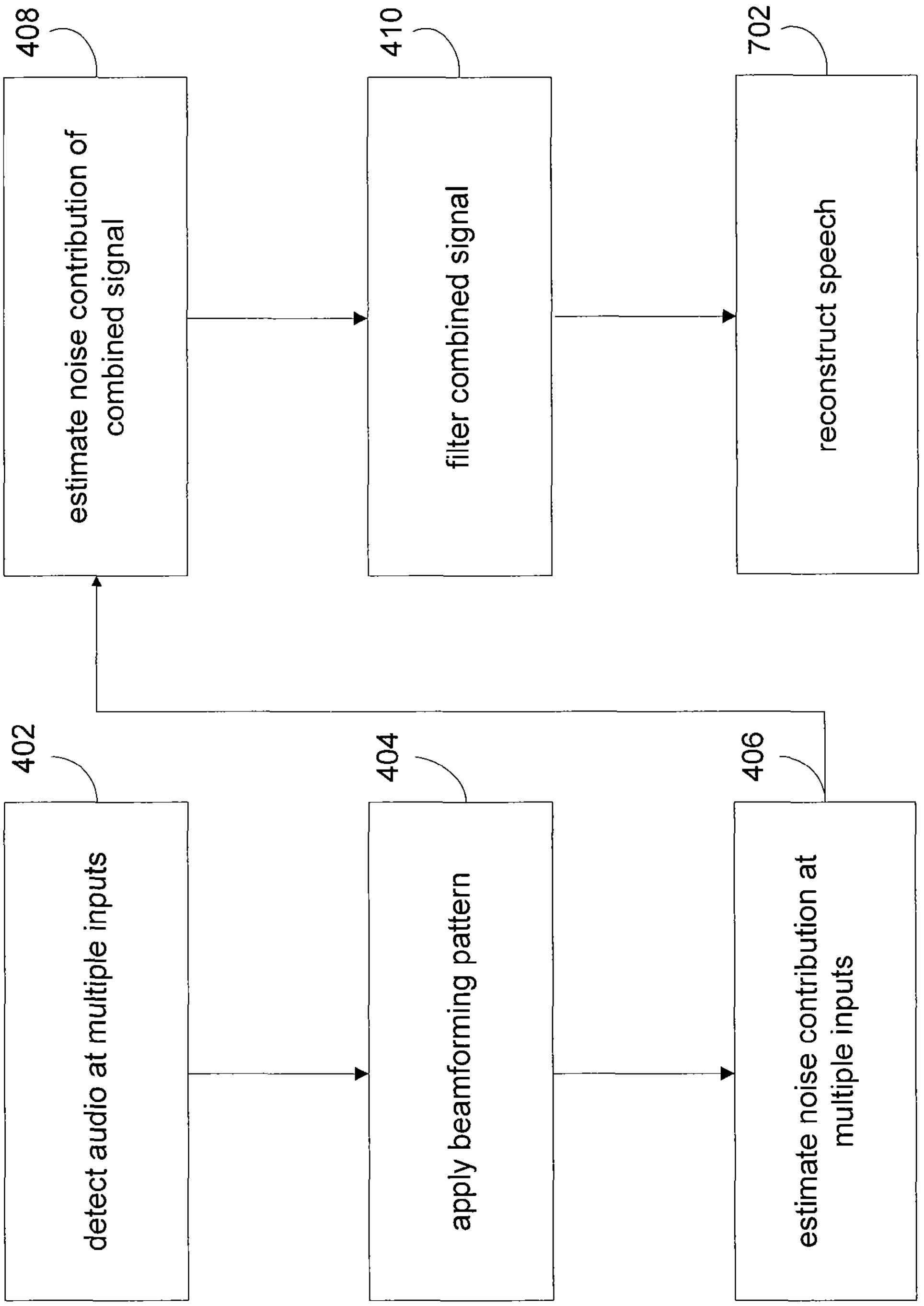
FIG. 7 is another alternative process that automatically removes noise (or undesired signals) from an input.

The signal processing method may further comprise a signal processing technique or a filtering array method that separates the communication signals into several components, each one comprising or containing a frequency sub-band of the original communication signals as shown at 502 of FIG. 5. The method or filter may isolate the different frequency components of the communication signals. In FIG. 6, the post-filtered communication signals are processed to synthesize speech at 602. In some processes, speech is synthesized at 702 by methods that may not separate communication signals into several components as shown in FIG. 7.

Figure 8:
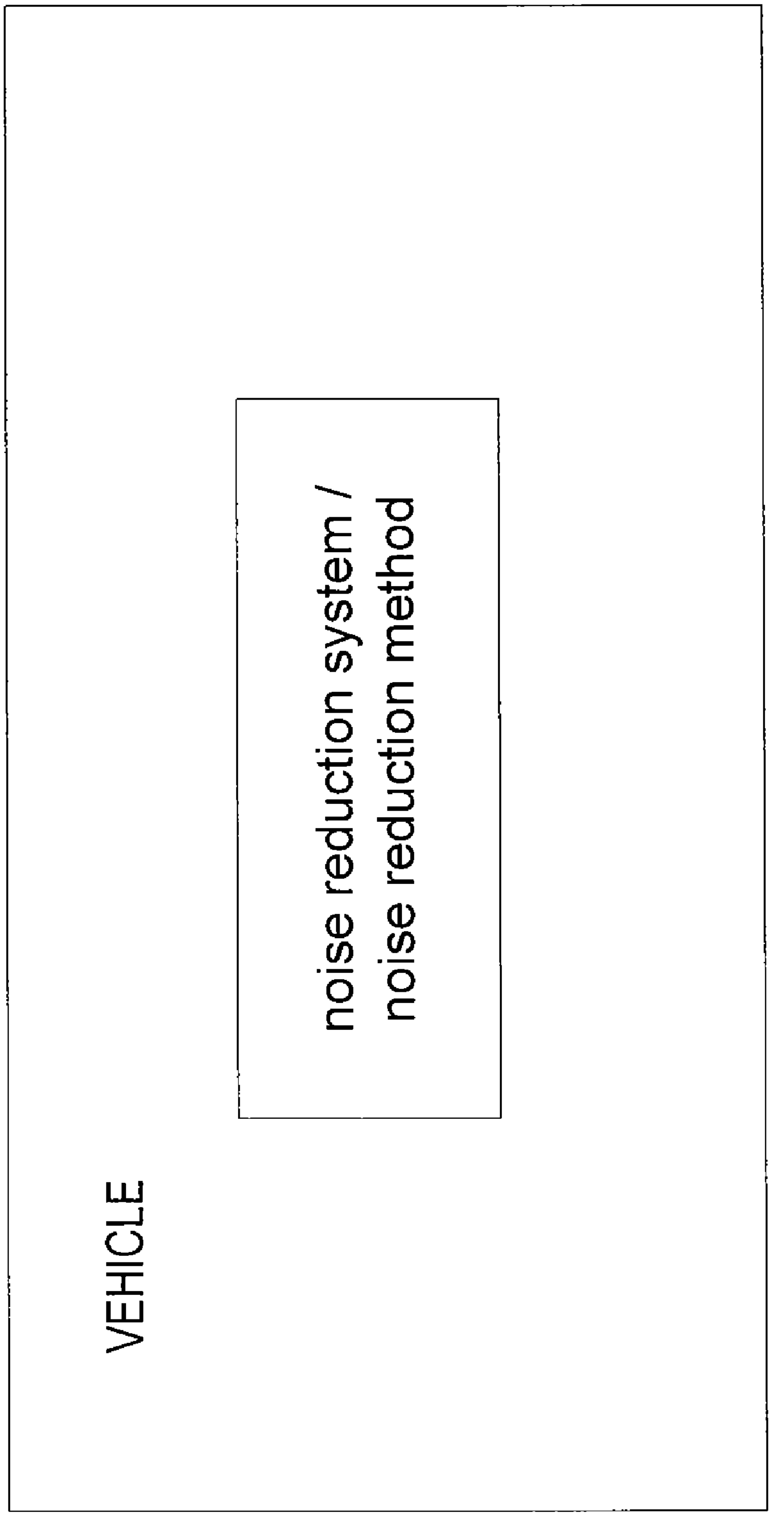
FIG. 8 is a noise reduction system or method interfaced to a vehicle.
Figure 9:
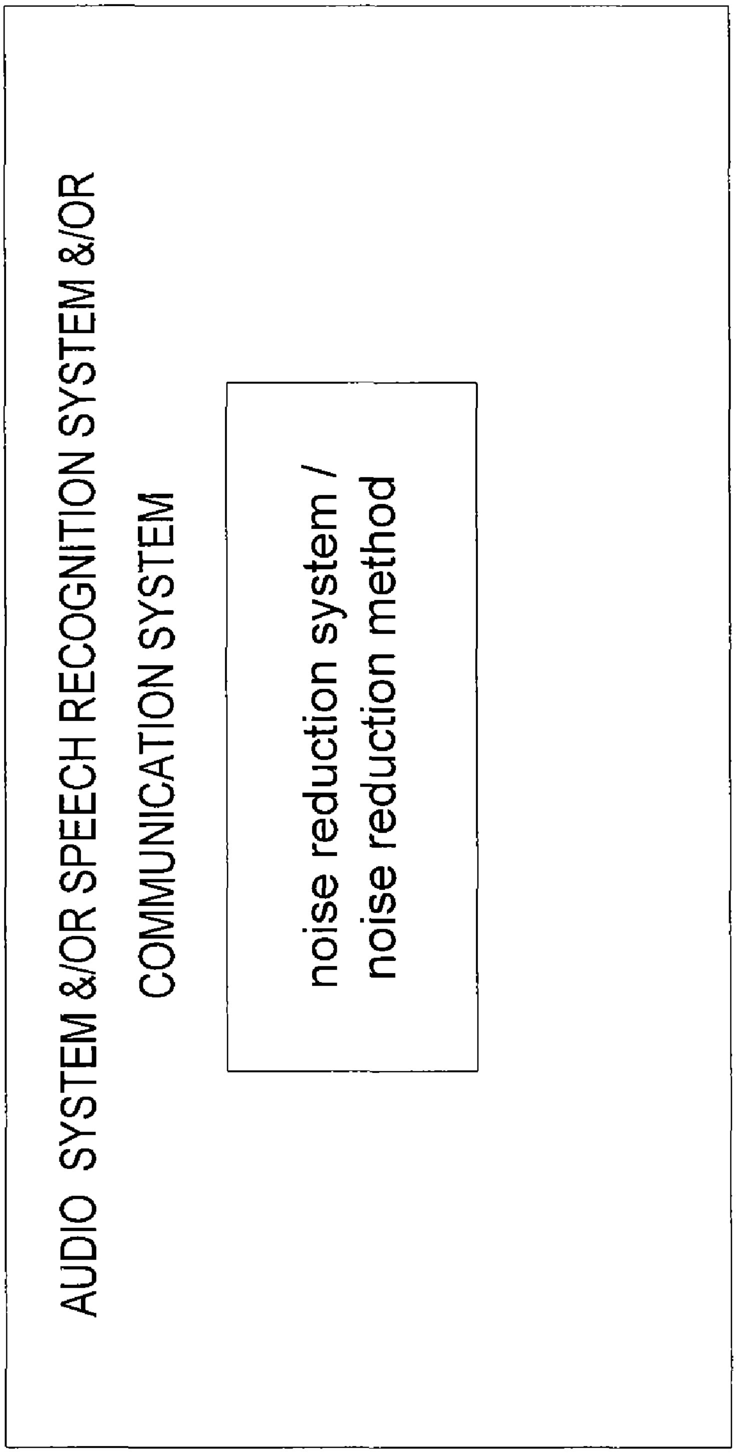
FIG. 9 is a noise reduction system or method interfaced to a communication system, a speech recognition system and/or an audio system.

The methods and descriptions of FIGS. 1-7 may be encoded in a signal bearing storage medium, a computer readable medium or a computer readable storage medium such as a memory that may comprise unitary or separate logic, programmed within a device such as one or more integrated circuits, or processed by a controller or a computer. If the methods are performed by software, the software or logic may reside in a memory resident to or interfaced to (or a system that interfaces or is integrated within) one or more processors or controllers, a wireless communication interface, a wireless system, a communication controller, an entertainment and/or comfort controller of a structure that transports people or things such as a vehicle (e.g., FIG. 8) or non-volatile or volatile memory remote from or resident to device. The memory may retain an ordered listing of executable instructions for implementing logical functions. A logical function may be implemented through digital circuitry, through source code, through analog circuitry, or through an analog source such as through an analog electrical, or audio signals. The software may be embodied in any computer-readable medium or signal-bearing medium, for use by, or in connection with an instruction executable system or apparatus resident to a vehicle (e.g., FIG. 8) or a hands-free or wireless communication system (e.g., FIG. 9). Alternatively, the software may be embodied in media players (including portable media players) and/or recorders. Such a system may include a computer-based system, a processor-containing system that includes an input and output interface that may communicate with an automotive or wireless communication bus through any hardwired or wireless automotive communication protocol, combinations, or other hardwired or wireless communication protocols to a local or remote destination, server, or cluster.

A computer-readable medium, machine-readable medium, propagated-signal medium, and/or signal-bearing medium may comprise any medium that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical or tangible connection having one or more links, a portable magnetic or optical disk, a volatile memory such as a Random Access Memory "RAM" (electronic), a Read-Only Memory "ROM," an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled by a controller, and/or interpreted or otherwise processed. The processed medium may then be stored in a local or remote computer and/or a machine memory.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. Method for audio signal processing, comprising detecting an audio signal from a microphone array to obtain communication signals;

processing the communication signals by a beamformer to obtain a beamformed signal;

processing the communication signals through a blocking matrix to obtain power densities of noise contributions of each of the communication signals;

processing the power densities of noise contributions of each of the communication signals to obtain an short-time power density from the power densities of noise contributions of each of the communication signals;

estimating the power density of a noise contribution of the beamformed signal based on the short-time power density obtained from the power densities of noise contributions of each of the communication signals; and post-filtering the beamformed signal based on the estimated power density of the noise contribution of the beamformed signal to obtain an enhanced beamformed signal.

2. The method according to claim 1 where the beamformed signal comprises output signals generated by adaptive filters subtracted from a delayed output of the communication signals.

3. The method of claim 2 where the delayed output of the communication signals comprises an output of a fixed beamformer.

4. The method of claim 2 where the adaptive filters comprise a blocking matrix.

5. The method of claim 1 where the short-term power density comprises an average short-term power density.

6. The method of claim 1 claim where the power density of a noise contribution of the beamformed signal is estimated by a multiplication of the short-time power density obtained from the power densities of noise contributions of each of the communication signals with a real factor.

7. The method of claim 1 where the post-filtering the beamformed signal comprises filtering the beamformed signal by a Wiener filter.

8. The method of claim 7 where an element of the transfer function of the Weiner filter is by optimization through a maximum a posteriori estimation method.

9. A computer program product comprising one or more computer readable storage media for automatically removing noise or undesired signals comprising:

converting sound into analog signals or digital communication signals;

conditioning the communication signals through one or more fixed weights or time delays that yield a combined signal;

estimating the noise contributions of each of the communication signals;

processing spectral power densities of the noise contribution of each of the communication signals;

estimating the noise contribution of the combined signal based on the spectral power densities of the noise contribution of each of the communication signals; and adapting the filter coefficients of a post-filter based on the estimated noise contribution of the combined signal.

10. The computer program product of claim 9 further comprising reconstructing an aural signal from an output of the post-filter.

11. The computer program product of claim 9 where the computer readable storage media interfaces a communication interface of a vehicle.

12. Signal processor that removing noise or undesired signals comprising:

a microphone array comprising two or more microphones configured to detect communication signals;

a beamformer configured to process the communication signals to render a beamformed signal;

a blocking matrix configured to process the communication signals to obtain power densities of noise contributions of each of the communication signals;

a processor configured to process the power densities of noise contributions of each of the communication signals to obtain an average short-time power density from the power densities of noise contributions of some of the communication signals;

a processor configured to estimate the power density of a noise contribution of the beamformed signal based on the short-time power density obtained from the power densities of noise contributions of each of the communication signals; and a post-filter configured to filter the beamformed signal based on the estimated power density of the noise contribution of the beamformed signal to obtain an enhanced beamformed signal.

13. The signal processor of claim 12, where the beamformer and the blocking matrix comprises a General Side Lobe Canceller.

14. The signal processor of claim 12 where the microphone array interfaces a speech recognition system.

15. The signal processor of claim 13 where the microphone array interfaces a speech recognition system.

16. The signal processor of claim 13 where the microphone array interfaces a speech recognition system.

* * * * *